Feb. 3, 1953  R. L. MILLER  2,627,541
DETERMINATION OF PITCH FREQUENCY OF COMPLEX WAVE
Filed June 20, 1951  3 Sheets-Sheet 1
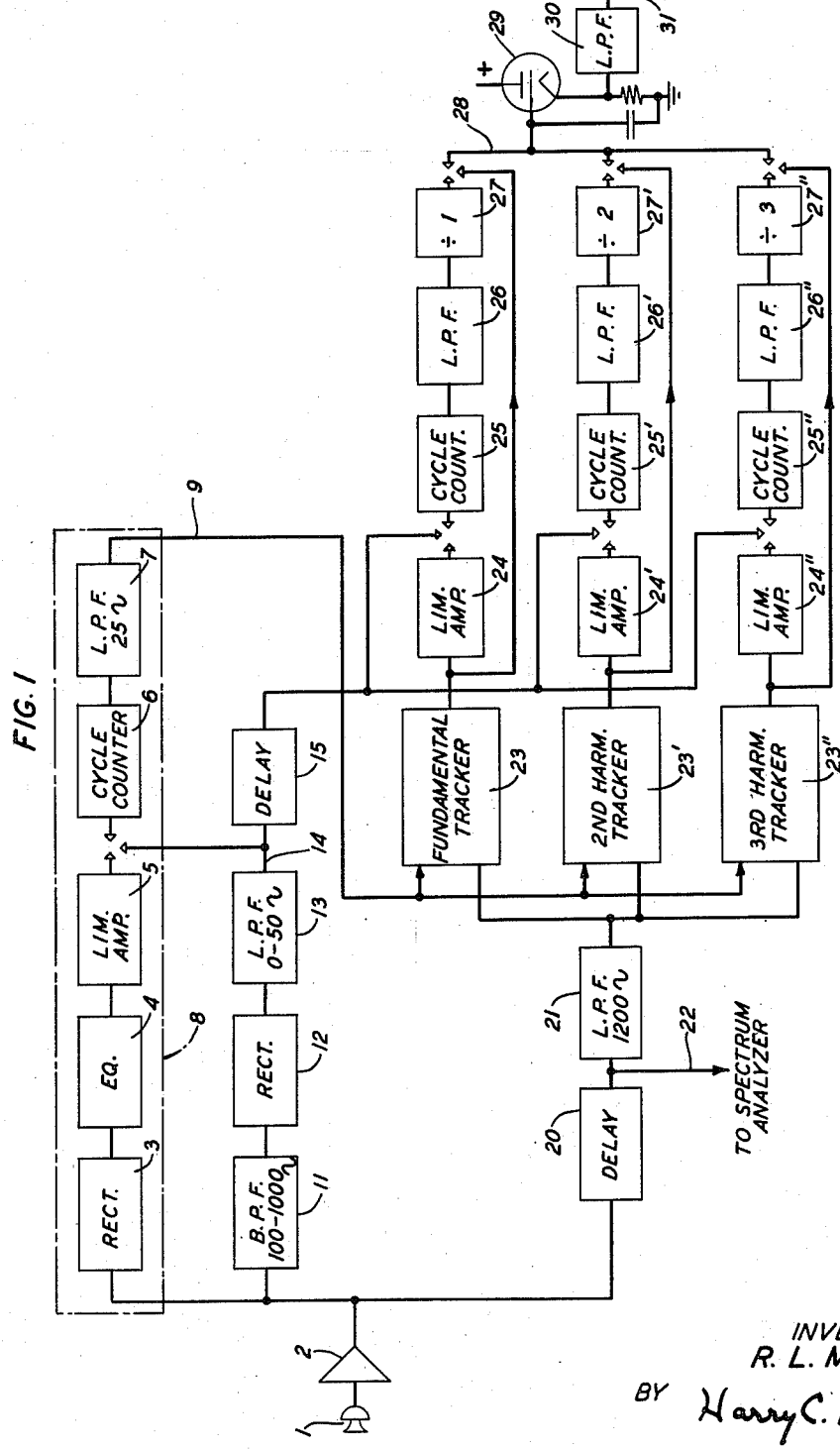
INVENTOR
R. L. MILLER
BY Harry C. Hart
ATTORNEY Feb. 3, 1953  R. L. MILLER  2,627,541
DETERMINATION OF PITCH FREQUENCY OF COMPLEX WAVE
Filed June 20, 1951  3 Sheets-Sheet 2
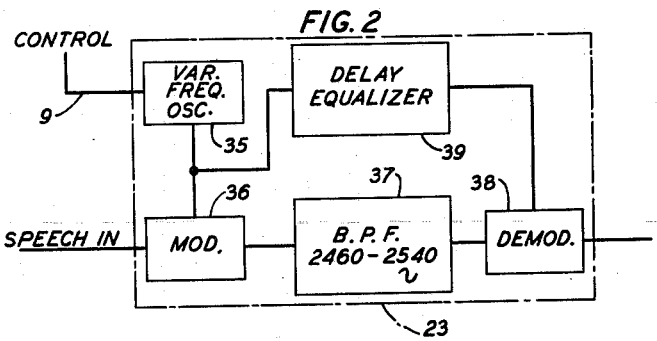
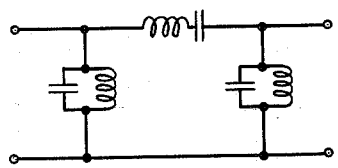
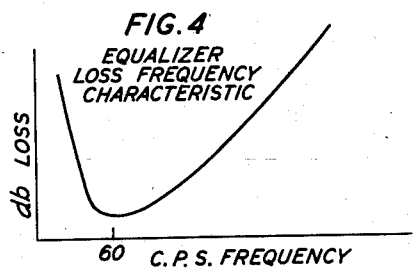
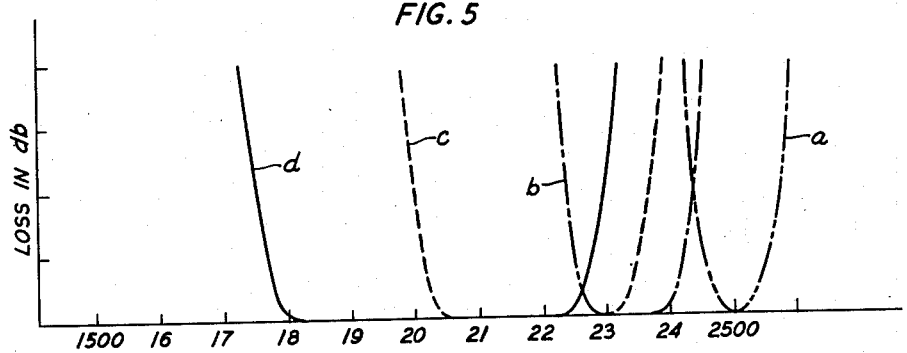
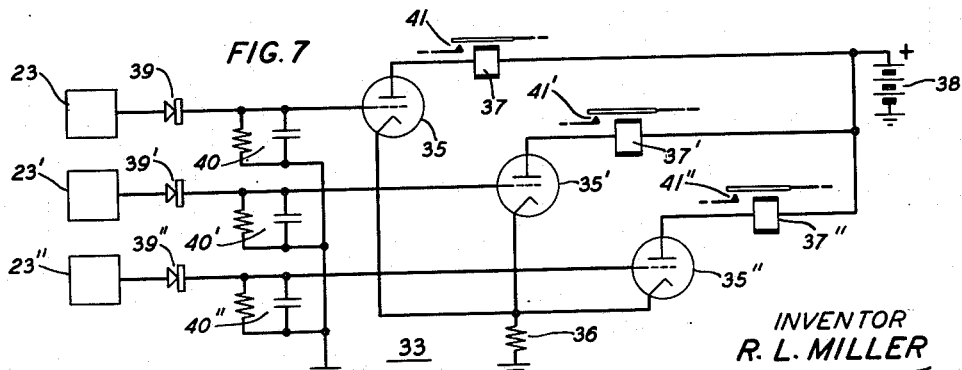
INVENTOR
R. L. MILLER
BY Harry C. Hart
ATTORNEY Feb. 3, 1953     R. L. MILLER     2,627,541
DETERMINATION OF PITCH FREQUENCY OF COMPLEX WAVE
Filed June 20, 1951     3 Sheets-Sheet 3
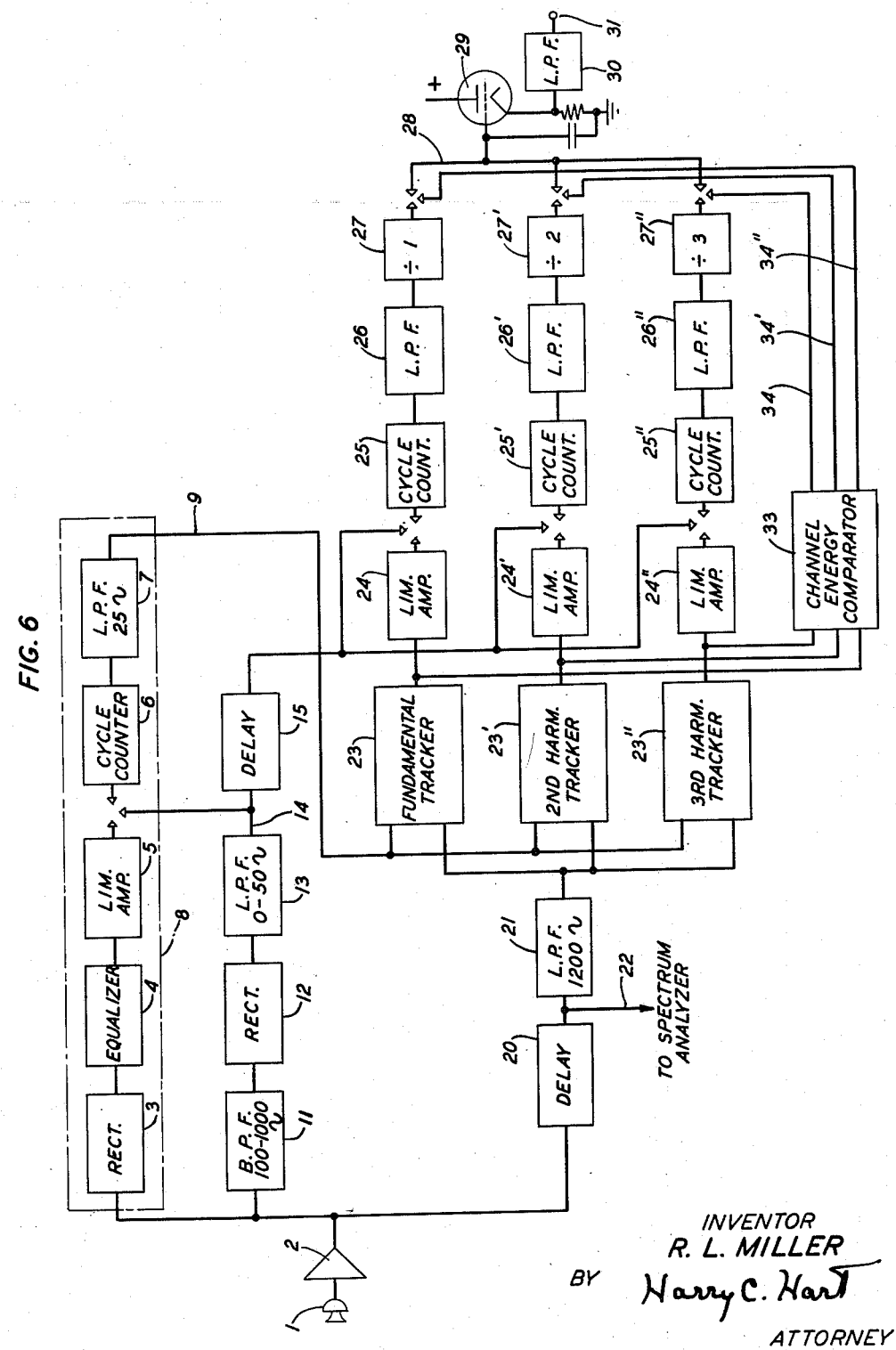
INVENTOR
R. L. MILLER
BY Harry C. Hart
ATTORNEY Patented Feb. 3, 1953

2,627,541

UNITED STATES PATENT OFFICE 2,627,541

DETERMINATION OF PITCH FREQUENCY OF COMPLEX WAVE

Ralph L. Miller, Chatham, N. J., assignor to Bell Telephone Laboratories, Incorporated, New York, N. Y., a corporation of New York Application June 20, 1951, Serial No. 232,595

9 Claims. (Cl. 175—183)

This invention relates to electrical communication and particularly to the derivation from a signal such as speech of significant indicia of its characteristics for transmission to a remote point where they may be utilized to control the reconstruction of the signal.

A primary object of the invention is to improve the accuracy and reliability of determinations of the fundamental frequency or pitch of a signal, e. g., a voice signal to be transmitted. A related object is to carry out such pitch determinations even while the pitch itself is changing.

Signal analyzing and synthesizing or "vocoder" systems of the general type wherein the intelligence content of a signal such as a speech wave is extracted in the form of a number of slowly varying unidirectional currents or voltages which are then used to control the operation of synthesizing apparatus in reconstructing the original wave have been described and claimed in H. W. Dudley Patents 2,151,091, 2,243,527 and R. R. Riesz Patent 2,183,248, as well as elsewhere. As there explained in full detail, systems of this class may be utilized for the analysis and synthesis of speech or other vocal signals, for frequency range reduction and restoration, or for other purposes, such as privacy of the transmitted message. In such systems, it is usual first to analyze the incoming signal wave to determine its "voiced" or "unvoiced" character. If the signal is of the so-called voiced type, it is further analyzed to determine its fundamental frequency, and this determination is converted into a readily usable control force.

In the past, there have been various approaches to the problem of determining the fundamental frequency. Thus, it has been proposed to count cycles using as the measure of the period of the speech wave the time separation between its nulls or between its peaks of greatest amplitude. However, in the case of many voices, particularly when they have been subjected to a certain amount of inevitable frequency distortion due to transmission through telephone apparatus, the fundamental component itself contains very little energy as compared with certain of its harmonics and may even be entirely absent. When this is the case, such a cycle count gives an incorrect result. It has therefore been proposed to track two selected preassigned harmonics, such as the second harmonic and the third harmonic, and beat them together on the principle that their difference frequency is equal to the frequency of the missing fundamental component. This approach ignores the fact that either one or both of the selected harmonic components may itself disappear and that no preselection of identified harmonic components can obviate this hazard. It is also open to the objection that the tracking filters are unable perfectly to follow rapid changes in the frequencies of the selected harmonics, so that frequency modulation of each harmonic results. In consequence, the measured frequency of the filter output which is nominally the second harmonic may differ considerably from twice that of the true fundamental, and similarly, the measured frequency of the filter output which is nomially the third harmonic may differ from three times that of the true fundamental. Since these differences may and often are of opposite signs, the error in the final determination of the fundamental frequency or pitch is accentuated.

The present invention is based on the recognition that by the very nature of a voiced sound, some harmonic component is always present and generally more than one. The identity of this harmonic changes from time to time, but it is always identifiable in principle; and when several are present, they are individually identifiable. The invention therefore, approaches the problem of determining the fundamental frequency by always basing the determination on those harmonics which are present in substantial strength, whichever they may be. Thus, if only the third is present, its frequency is metered and the result is divided by 3 to provide the required control signal. If the second and fourth are present, the frequency of each is metered. The result of the first metering is divided by 2 and the second by 4 and the average of these two results serves as the control signal. Thus, the apparatus is never left at a loss by the vanishing of some preselected component for which it is designed. Furthermore, errors in the output of any one harmonic frequency meter tend to be offset by those of another so that the final result is less subject to errors than it would be if any single harmonic component were relied upon exclusively.

To identify a harmonic component and hold it in view for examination throughout its changes in frequency, a tracking filter or the equivalent is necessary. An application of R. C. Mathes, Serial No. 24,227, filed April 30, 1948, now Patent No. 2,562,109, issued July 24, 1951, employs a tunable filter of the variable inductance type, the output being fed back to a control winding to maintain the filter tuned to the harmonic component which it is designed to pass. But a filter of this character inevitably introduces errors in the form of frequency modulations. In accordance with a further feature of the invention, such frequency modulation errors are removed from the output of each filter before it is metered. This is accomplished by employing a filter of the heterodyne variety comprising a fixed, narrow-band static filter, a modulator and a variable frequency oscillator which is continuously tuned by a control signal to a frequency such that the sum or the difference of its frequency and that of the desired harmonic component of the speech signal passes through the fixed band filter. The filter output is then demodulated by beating it against the output of the same variable frequency oscillator, appropriately delayed in time. As a result, any departures of the original modulation product from its nominal value, due either to imperfect tracking of the variable frequency element, in this case the oscillator, or to minor fluctuations in the control signal, are compensated in the demodulation process.

This feature of the invention which, of course, may be employed by itself, adds greatly to the accuracy with which the frequency of each harmonic component is determined and, therefore, to the accuracy of the final averaged output, i. e., the fundamental frequency or pitch control signal.

The invention will be fully apprehended from the following detailed description of a preferred illustrative embodiment thereof taken in connection with the appended drawings, in which:

Fig. 1 is a block schematic diagram of apparatus for determining the fundamental frequency of a speech signal from the strongest harmonic component or components present in it;

Fig. 2 is a block schematic diagram of a harmonic tracking circuit in accordance with the invention;

Fig. 3 is a schematic circuit diagram of a single section of a filter which may be employed in carrying out the invention;

Fig. 4 is a loss-frequency characteristic of one component of the apparatus of Fig. 1;

Fig. 5 shows the loss-frequency characteristics of various components of Figs. 1 and 2;

Fig. 6 is a block schematic diagram of apparatus which is a variant of that of Fig. 1; and Fig. 7 is a schematic circuit diagram showing the details of one of the blocks of Fig. 6.

In the circuit of Fig. 1 in which energy paths are shown by single line for the sake of simplicity, an alternating voltage wave such as a speech signal wave, the frequency of the fundamental component of which is to be determined and which may originate in a microphone 1, a telephone subset, or otherwise, is applied by way of an amplifier 2 to the input terminals of the apparatus where it follows three paths. Referring first to the upper path, this contains a rectifier 3, an equalizer 4 whose frequency characteristic may be as indicated in Fig. 4, a limiting amplifier 5, a cycle counter 6, and a low pass filter 7, proportioned to cut off at about 25 cycles per second. This apparatus combination 8 is well known in the art and is disclosed for example, in Riesz Patent 2,522,539. It serves to make an approximate determination of the fundamental frequency or pitch of the incoming energy and to deliver on the conductor 9 a control voltage proportional thereto for use in the manner hereafter described.

The second path comprises a bandpass filter 11 whose pass band extends from approximately 100 cycles per second to approximately 1000 cycles per second, a rectifier 12, and a low pass filter 13 whose cut-off is set at approximately 50 cycles per second. This path serves merely to distinguish between voiced sounds and unvoiced sounds. If the incoming energy is that of a voiced sound, a control signal appears on the output conductor 14 which establishes the path between the limiting amplifier 5 and the cycle counter 6. When the sound is not voiced, the output conductor 14 is not energized, and the path connecting the limiting amplifier 5 to the counter 6 is disestablished.

In this part of the circuit as well as elsewhere, a path which may be established or disestablished in dependence on whether or not a control signal appears is indicated by two opposing arrowheads, while the control signal itself is indicated by a third arrowhead pointing toward the first two. The fact that the first two arrowheads are separated is to be taken as indicating that in the absence of a control signal, the path is disestablished, to be established by the arrival of a control signal.

The third path comprises, first, a delay device 20 of any desired construction followed in tandem by a low pass filter 21 whose cut-off frequency is adjusted to pass the highest contemplated harmonic component of the highest pitched voice, thus excluding only the energy resulting from unvoiced sounds and noises. The delay device 20 is interposed merely to compensate for delays elsewhere in the system, particularly in the upper or approximate pitch determination path 8.

An additional path 22, whose details are not shown, may lead to a conventional vocoder spectrum analyzer, as shown, for example, in the Riesz patent above mentioned.

Voiced sound energy which passes the filter 21 is now applied to a plurality of harmonic component tracker units 23, 23', 23'' in parallel. The number of such units may be as great as desired and is shown here for illustration as three, the first of which 23 tracks the fundamental component of the incoming energy, the second 23' tracks the second harmonic component, and the third 23'' tracks the third harmonic component. The details of these tracking circuits will be fully discussed below.

The output of each of these tracker units, when they operate correctly, is a wave having the frequency of the particular component tracked; that is to say, the energy on the output conductor of the fundamental tracker 23 has the frequency of the fundamental component of the input energy, that on the output conductor of the second harmonic 23' has the frequency of its second harmonic, and that on the output conductor of the third harmonic tracker 23'' has the frequency of its third harmonic. Each of these output conductors is connected to a frequency determining circuit similar to that of the upper path, namely, a limiting amplifier 24, a cycle counter 25, and a low pass filter 26 connected in tandem in the order named. In each case, the path connecting the limiter 24 to the cycle counter 25 is shown as normally disabled and provision is made for enabling it by the output of the low pass filter 13 in the second path in the same fashion as was employed to enable the upper path. To compensate for delays elsewhere in the system, a delay device 15 of any desired variety is interposed.

The outputs of the two low pass filters 26', 26'' which are proportional, respectively, to the frequencies of the second harmonic and of the third harmonic of the incoming energy are now divided by 2 and 3, respectively. These outputs are in the form of unidirectional voltages which vary slowly, e. g., at syllabic or inflection frequencies, and the divisions may conveniently be carried out by dividers 27', 27'' of any sort, such as ordinary resistance pads or voltage dividers in well-known fashion. For the sake of completeness and symmetry, a similar circuit element 27 for dividing the signal output of the fundamental cycle counter by 1 is included on the drawing. These divisions by 1, 2, and 3, respectively, serve to normalize the signal outputs of the three filters 26, 26', 26'' and bring them, so to speak, to a common denominator, whereupon they may be averaged. To this end, the several outputs are brought together on a single output conductor 28 and applied to a high impedance translating device such as the grid of a vacuum tube 29 connected as a cathode follower. As is well known, voltages thus brought together on a common conductor and applied to a high impedance output circuit are averaged so that the voltage taken from the cathode resistor of the cathode follower 29 and applied by way of a low pass filter 30 to a final output terminal 31 of the apparatus as a whole is proportional to the average of the normalized harmonic frequencies. With this arrangement, random deviations among the several harmonic outputs from exact harmonic relation to the fundamental frequency component tend to offset one another and so to cancel out, giving a more reliable indication of the fundamental frequency than has heretofore been possible.

In the event that the fundamental component itself or any one of the harmonics for which provisions is made, or indeed any two of these, should in the course of the variations of the input wave become so small that the cycle counter is unable to determine its frequency, then failure of a control signal derived from the output of the particular harmonic tracker operates to open the circuit of this path. Thus, for example, if the second harmonic should momentarily disappear or be of such a low energy content as to be unable to operate the cycle counter, the path from the second harmonic tracker 23' to the averaging conductor 28 is disestablished, whereupon the average is taken between the output of the fundamental tracker and ⅓ of the output of the third harmonic tracker. Similar operations take place with respect to any one or two components which may normally be too weak and, therefore, too unreliable for use. The apparatus, therefore, takes the best possible average of those harmonic components which are present in sufficient strength to permit of reliance on their frequencies.

Coming now to the circuit details of the harmonic trackers 23, 23', 23'' themselves, it is well known to provide tunable bandpass filters having variable reactances which are adjusted by control signals to hold the filter tuned to a particular desired harmonic component, i. e., the fundamental component, the second harmonic, the third harmonic, etc. However, any such variable reactance element is open to the objection that it is inherently restricted in the speed with which it can follow changes in the frequency of the harmonic component which is being tracked; and any lag in the tracking process manifests itself as a departure of the output frequency from its correct value. Such departures take the form of spurious frequency modulations.

Referring to Fig. 2, the present invention provides, for each of the harmonic components to be tracked, a tracking circuit whose construction and arrangement avoids this difficulty. Instead of adjusting the mid-frequency of a reactive filter to embrace the desired harmonic component, the control signal derived from the upper path of Fig. 1, which appears on the conductor 9 and represents an approximate measure of the pitch of the incoming signal, is utilized to vary the oscillation frequency of an oscillator 35 in such fashion that the cross-product or side frequency of this oscillation with the desired harmonic component of the speech, which cross-product is generated by a modulator 36 of any suitable variety, falls within the comparatively narrow pass band of a filter 37. The variable frequency oscillator 35 may be of any desired sort, but because the highest possible speed of response is desirable, a preferred form of oscillator is a multivibrator or relaxation oscillator whose frequency may be controlled in well-known fashion by the application of a slowly varying unidirectional voltage to the grid of one of its tubes. As long as the voltage swing available on the output conductor 9 of the approximate pitch determining circuit 8 is sufficient to swing the oscillation frequency through the widest required range, this range may be reduced as much as desired by the interposition of a voltage divider in the form of a simple resistance pad in the manner well known in the art.

In accordance with the invention, the output of this same oscillator 35 is applied to a demodulator 38 connected to the narrow bandpass filter 37 in tandem, where it operates to demodulate the filter output. Furthermore, and in accordance with another aspect of the invention, a delay equalizer 39 is interposed in the direct path between the variable oscillator 35 and the demodulator 38, and this delay equalizer is adjusted to provide exactly the same delay in the upper path of Fig. 2 as is provided in the lower path of Fig. 2. This ensures that the correct frequency shall be available for demodulation at the correct instant. However, the delay equalizer 39 must evidently pass a much wider band of frequencies than is passed by the lower path. More precisely, it must pass a band which extends from the lower limit of the variable oscillator frequency to its upper limit. Furthermore, this band differs among the several tracking circuits, the band for the delay equalizer in the second harmonic tracker being twice as wide, and in the delay equalizer for the third harmonic tracker being three times as wide, as that of the delay equalizer for the fundamental component tracker. These requirements will be clarified by the following consideration.

It is well known that a bandpass filter may be constructed to have substantially any desired mid-frequency and any desired band width by the connection together of circuit elements in various configurations, as shown, for example, in Fig. 3. In particular, a single section of a filter having the configuration of Fig. 3 can be constructed to provide a pass band whose width is 80 cycles and whose mid-frequency is 2500 cycles. The narrow band filter 37 of Fig. 2 may be of this construction, and the corresponding filters in the second harmonic tracker and in the third harmonic tracker may be identical. Their characteristic is shown in curve a of Fig. 5.

By way of example, let it be assumed that the system is designed to cope with the fundamental, the second harmonic, and the third harmonic of any voice or other signal whose fundamental frequency may lie anywhere in the range from 80 cycles per second to 240 cycles per second. The ranges of the several harmonic components and the corresponding requirements on the range of variation of the frequency of the oscillator and, therefore, the pass bands of the delay equalizers are set forth in the following table.

Table

| Component | Component Range | | Oscillator Range and Equalizer Band | | |
|---|---|---|---|---|---|
| | Lower Limit | Upper Limit | Lower Limit | Upper Limit | Spread f |
| Fundamental | 80 | 240 | 2,260 | 2,420 | 160 |
| 2nd Harmonic | 160 | 480 | 2,020 | 2,340 | 320 |
| Third Harmonic | 240 | 720 | 1,780 | 2,260 | 480 |

This tabulation shows that in the illustrative case taken, the pass band of the delay equalizer 39 in the fundamental tracker 23 must be twice as wide as that of its bandpass filter 37; and that the pass band of the delay equalizer 39' in the second harmonic tracker 23' must be four times as wide; and in the third harmonic tracker six times as wide. These characteristics are shown in curves b, c, d of Fig. 5.

It is known in the art of filter design that, given two required pass bands, one of which is N times as wide as the other, and given that the narrower one is produced by a single section of a filter such as that of Fig. 3 with specified values for the elements, then if the element values are changed to give the wider pass band in the second case, it will contribute a much smaller time delay. But the time delays may be equalized in the simple and direct fashion of employing N times as many sections in the second case as in the first. Therefore, if a number M of sections having the configuration of Fig. 3 are employed in each case for the narrow bandpass filter of Fig. 2, then a number 2M of sections having the same configuration but different element values should be employed in the delay equalizer 39 of the fundamental tracker, a number 4M of sections in the delay equalizer 39' of the second harmonic tracker, and a number 6M in the delay equalizer 39'' of the third harmonic tracker. In the simple case in which the bandpass filter has but one section, the fundamental delay equalizer 39 employs two sections, the second harmonic delay equalizer 39' four sections, and the third harmonic delay equalizer 39'' six sections, and so on.

This arrangement ensures that every oscillation of the variable frequency oscillator 35 shall be applied to the demodulator 38 for recovery of the particular harmonic component at precisely the time it is needed, namely, after a delay exactly equal to the delay interposed by the modulator 36 and the bandpass filter 37. As a result, errors due to inaccuracies and fluctuations in the approximate pitch control signal, and in any failure of the variable frequency oscillator 35 to follow this signal perfectly, are cancelled out.

Under some circumstances, it may turn out that some one or other of the several harmonic components of the input signal wave is, for the most part, of considerably greater strength than any others; and under these circumstances, it may be preferred not to utilize the averaging apparatus described in connection with Fig. 1 but rather to make the frequency determination on the basis of the strongest component by itself, whichever it may be. The apparatus of Fig. 6 is designed to carry out this operation. For the most part, this apparatus is identical with Fig. 1, and the various apparatus components are similarly numbered. The sole departure from the arrangement of Fig. 1 is in connection with the enablement of the paths which lead from the several dividers 27 to the common output conductor 28. A tap is connected to the output conductor of the fundamental tracker 23, another tap to the output conductor of the second harmonic tracker 23', and a third to the output terminal of the third harmonic tracker 23''; and these three taps are connected to a signal strength comparator 33 whose internal circuit details will be explained below. This comparator operates to select that harmonic component which is the strongest of those present and to energize a corresponding one of its several output conductors 34, 34', 34'', leaving the others unenergized. Energization of this output conductor acts to establish the signal path from the corresponding divider 27 to the amplifier tube 29, leaving the others disestablished.

The circuit details of the comparator 33 may be of any desired variety. A convenient circuit is illustrated in Fig. 7. It comprises three triodes 35, 35', 35'' whose cathodes are connected together and by way of a common resistor 36 to ground. Their anodes are connected by way of relay coils 37, 37', 37'' to a positive potential source 38. The outputs of the several trackers 23 are connected to the grids of these several tubes 35 by way of rectifiers 39, a resistor-condenser combination 40 being connected in each case from grid to ground to remove minor fluctuations. In operation, signals of different magnitudes being applied by way of the rectifiers 39 to the several grids, current flows through the tube to whose grid there has thus been applied the potential of the largest positive value. The resulting current flows through the common cathode resistor 36 and establishes across it a voltage drop which raises the cathodes of all of the other tubes 35 of the group above their cut-off values. As a result, current flows only through the cathode-anode circuit of that one tube 35 whose grid is connected to the output of the tracker 23 which recognizes the greatest amount of energy. The flow of current in the cathode-anode circuit of this tube energizes the coil 37 which is connected in series with its anode, and so closes the relay contacts 41 which may be connected in series with the corresponding harmonic path.

What is claimed is:

1. In a system for deriving an indication of the frequency of the fundamental component of a complex signal wave from such harmonic components as may be present in said wave, a plurality of automatically tunable bandpass filters, means for deriving an approximate pitch control voltage, means responsive to said control voltage to tune each of said filters to pass a corresponding harmonic component of said wave, means deriving from the output of each of said filters a voltage proportional to the frequency of the corresponding harmonic component, means for dividing each of said last-named voltages by a factor equal to the order of said harmonic component, means for averaging said voltages as thus divided, and means for transmitting a signal indicative of the averaged value of said voltages.

2. In a system for deriving an indication of the frequency of the fundamental component of a complex signal wave from such harmonic components as may be present in said wave, a plurality of automatically tunable bandpass filters, means for deriving from said wave a control voltage which is approximately proportional to the frequency of the fundamental frequency component of said wave, means responsive to said control voltage to tune each of said filters to pass a corresponding harmonic component of said wave, means deriving from the output of each of said filters a voltage proportional to the frequency of the corresponding harmonic component, means for dividing each of said last-named voltages by a factor equal to the order of said harmonic component, means for averaging said voltages as thus divided, and means for transmitting a signal indicative of the averaged value of said voltages.

3. In a system for deriving an indication of the frequency of the fundamental component of a complex signal wave from such harmonic components as may be present in said wave, a plurality of automatically tunable bandpass filters, means for deriving from said wave a control voltage which is approximately proportional to the frequency of the fundamental frequency component of said wave, means responsive to said control voltage to tune each of said filters to pass a corresponding harmonic component of said wave, means deriving from the output of each of said filters a voltage proportional to the frequency of the corresponding harmonic component, means for dividing each of said last-named voltages by a factor equal to the order of said harmonic component, means for removing from the group of said filter output voltages any derived from a filter whose input signal strength is below a preassigned threshold value, means for averaging the remaining ones of said voltages as thus divided, and means for transmitting a signal indicative of said averaged value.

4. In a system for deriving an indication of the frequency of the fundamental component of a complex signal wave from such harmonic components as may be present in said wave, a plurality of automatically tunable bandpass filters, means for deriving from said wave a control voltage which is approximately proportional to the frequency of the fundamental frequency component of said wave, means responsive to said control voltage to tune each of said filters to pass a corresponding harmonic component of said wave, means deriving from the output of each of said filters a voltage proportional to the frequency of the corresponding harmonic component, means for dividing each of said last-named voltages by a factor equal to the order of said harmonic component, means for selecting that filter output whose input is the strongest one of said harmonic components, and means for transmitting said selected filter output.

5. In a system for deriving an indication of the frequency of the fundamental component of a complex signal wave from such harmonic components as may be present in said wave, a plurality of automatically tunable bandpass filters, means for deriving from said wave a control voltage which is approximately proportional to the frequency of the fundamental frequency component of said wave, means responsive to said control voltage to tune each of said filters to pass a corresponding harmonic component of said wave, means deriving from the output of each of said filters a voltage proportional to the frequency of the corresponding harmonic component, means for selecting that filter output whose input is the strongest one of said harmonic components, means for discarding the remaining filter outputs, and means for transmitting a signal indicative of said selected derived filter output.

6. In a system for deriving an indication of the frequency of the fundamental wave component of a complex signal wave in the presence of at least one harmonic component which is of substantially greater strength than said fundamental component, means for first deriving a control voltage which is an approximate indication of the frequency of said fundamental component, a tunable oscillator, a filter, means for modulating said complex wave by the output of said oscillator, means responsive to said control voltage for continuously tuning said oscillator to a frequency such that a modulation product of the oscillation frequency with a selected harmonic component of the complex signal wave falls within the pass band of said filter, a heterodyne demodulator having a first and a second input terminal and an output terminal, a first path extending from said modulating means by way of said filter to said first input terminal for applying said modulation product to said demodulator, a second path extending from said oscillator to said second input terminal for applying unmodulated oscillations to said demodulator, means for deriving an indication of the frequency of the output of said demodulator, and means for dividing said indication by a factor equal to the order of said selected harmonic component.

7. In a system for deriving an indication of the frequency of a selected frequency component of a changing complex signal wave, means for first deriving a control voltage which is an approximate indication of the frequency of said component, a tunable oscillator, a filter, means for modulating said complex wave by the output of said oscillator, means responsive to said control voltage for continuously tuning said oscillator to a frequency such that a modulation product of the oscillation frequency with said component falls within the pass band of said filter, a heterodyne demodulator having a first and a second input terminal and an output terminal, a first path extending from said modulating means by way of said filter to said first input terminal for applying said modulation product to said demodulator, a second path extending from said oscillator to said second input terminal for applying unmodulated oscillations to said demodulator, and a delay equalizer included in said second path and proportioned to introduce into said second path a delay equal to that introduced into said first path by said filter, whereby said selected component is recovered independently of distortions introduced by the inability of said oscillator to respond correctly to frequency-change control signals.

8. In a system for deriving an indication of the frequency of the fundamental wave component of a complex signal wave in the presence of at least one harmonic component which is of substantially greater strength than said fundamental component, means for first deriving a control voltage which is an approximate indication of the frequency of said fundamental component, a tunable oscillator, a filter, means for modulating said complex wave by the output of said oscillator, means responsive to said control voltage for continuously tuning said oscillator to a frequency such that a modulation product of the oscillation frequency with a selected harmonic component of the complex signal wave falls within the pass band of said filter, a heterodyne demodulator having a first and a second input terminal and an output terminal, a first path extending from said modulating means by way of said filter to said first input terminal for applying said modulation product to said demodulator, a second path extending from said oscillator to said second input terminal for applying unmodulated oscillations to said demodulator, a delay equalizer included in said second path, said delay equalizer being proportioned to introduce into said second path a delay equal to that introduced into said first path by said filter, whereby said selected harmonic component is recovered independently of distortions introduced by the inability of said oscillator to respond correctly to frequency-change control signals.

9. In a system for deriving an indication of the frequency of the fundamental wave component of a complex signal wave in the presence of at least one harmonic component which is of substantially greater strength than said fundamental component, means for first deriving a control voltage which is an approximate indication of the frequency of said fundamental component, a tunable oscillator, a filter comprising a number of similar reactive networks connected in tandem, each of said networks having a fixed relatively narrow pass band, means for modulating said complex wave by the output of said oscillator, means responsive to said control voltage for continuously tuning said oscillator to a frequency such that a modulation product of the oscillation frequency with a selected harmonic component of the complex signal wave falls within the pass band of said filter, a demodulator, a first path from said oscillator to said demodulator and including said filter for applying the output of said filter to said demodulator and a second path from said oscillator to said demodulator, and a delay equalizer included in said second path, said delay equalizer comprising a number of like reactive networks, each network having a pass band equal to the frequency range of said selected harmonic component, said equalizer comprising $n$ times as many networks as said filter, where $n$ is the ratio of the equalizer band width to the filter band width, whereby said selected harmonic component is recovered independently of distortions introduced by the inability of said oscillator to respond correctly to frequency-change control signals.

RALPH L. MILLER.

REFERENCES CITED

The following references are of record in the file of this patent:

UNITED STATES PATENTS

| Number | Name | Date |
|---|---|---|
| 2,510,268 | Wagner | June 6, 1950 |
| 2,522,369 | Guanella | Sept. 12, 1950 |
| 2,553,610 | Singleton | May 22, 1951 |